(12) United States Patent
Lam et al.

(10) Patent No.: US 7,245,637 B2
(45) Date of Patent: Jul. 17, 2007

(54) METHODS AND APPARATUS FOR SUPPRESSING SIGNALING TONES IN TELEPHONY SIGNAL

(75) Inventors: Siu H. Lam, Woodcliff Lake, NJ (US); Kai X. Miao, Boonton Township, NJ (US)

(73) Assignee: Intel Corporation, Santa Clara, CA (US)

( * ) Notice: Subject to any disclaimer, the term of this patent is extended or adjusted under 35 U.S.C. 154(b) by 929 days.

(21) Appl. No.: 10/660,180

(22) Filed: Sep. 11, 2003

(65) Prior Publication Data

US 2005/0058120 A1     Mar. 17, 2005

(51) Int. Cl.
H04J 3/06 (2006.01)
(52) U.S. Cl. ............ 370/512; 370/510; 370/514; 370/516; 370/517; 370/519; 370/471; 370/352; 370/354; 370/355; 370/356; 379/386; 379/387.01; 379/387.02
(58) Field of Classification Search ........ None
See application file for complete search history.

(56) References Cited

U.S. PATENT DOCUMENTS

| | | | |
|---|---|---|---|
| 5,687,177 A | 11/1997 | Chitrapu et al. | |
| 6,356,554 B1 * | 3/2002 | Pickett et al. | 370/402 |
| 6,504,838 B1 * | 1/2003 | Kwan | 370/352 |
| 2003/0112796 A1 * | 6/2003 | Kwan | 370/352 |
| 2005/0058273 A1 * | 3/2005 | Lam et al. | 379/386 |

\* cited by examiner

*Primary Examiner*—Raj K. Jain
(74) *Attorney, Agent, or Firm*—Buckley, Maschoff & Talwalkar LLC

(57) ABSTRACT

In some embodiments, a method includes detecting a tone in each data frame of a sequence of telephony signal data frames. A first data frame of the sequence of telephony signal data frames may be transmitted immediately after detecting the tone therein. Transmission of a last one or last ones of the sequence of telephony signal data frames may be deferred. It may then be determined whether the tone is present in a next data frame that immediately follows the sequence of telephony signal data frames. If it is determined that the tone is not present in the next data frame, the last one or ones of the sequence of data frames and the next data frame may be transmitted. If it is determined that the tone is present in the next data frame, a respective replacement data frame may be transmitted in place of each one of the last one or last ones of the sequence of data frames and in place of the next data frame.

34 Claims, 6 Drawing Sheets

METHODS AND APPARATUS FOR SUPPRESSING SIGNALING TONES IN TELEPHONY SIGNAL

BACKGROUND

Processing of telephone signals typically requires inclusion in the telephone signals of standard signaling tones such as DTMF (dual tone multi-frequency) tones or call progress tones. However, when telephone signals are transmitted according to certain techniques, such as VOIP (voice over internet protocol), it may be desirable to suppress signaling tones within the voice band and to replace those tones with out of band signaling, or with standardized special signaling data frames, as proposed in RFC (Request for Comments) 2833, published by the Internet Engineering Task Force (IETF).

Suppression or "clamping" of frames that include a signaling tone may entail trade-offs. A tone having a duration of less than 30 to 40 milliseconds (e.g., 3 to 4 10-millisecond data frames) may not be considered to be a valid tone, and a typical clamping regime may not call for clamping such relatively short tones. A longer tone (30 to 40 milliseconds or more) may typically be clamped, at least in part. Since delay in frame transmission may be undesirable in real-time communication sessions, it has been proposed to transmit the first three frames of a tone signal, and then to clamp the fourth and succeeding frames. A possible drawback to this proposal may be that the tone duration in the first three transmitted frames may be sufficiently long to trigger tone detection at a destination for the signal, which may interfere with proper reception of the signal.

DETAILED DESCRIPTION

Figure 1:
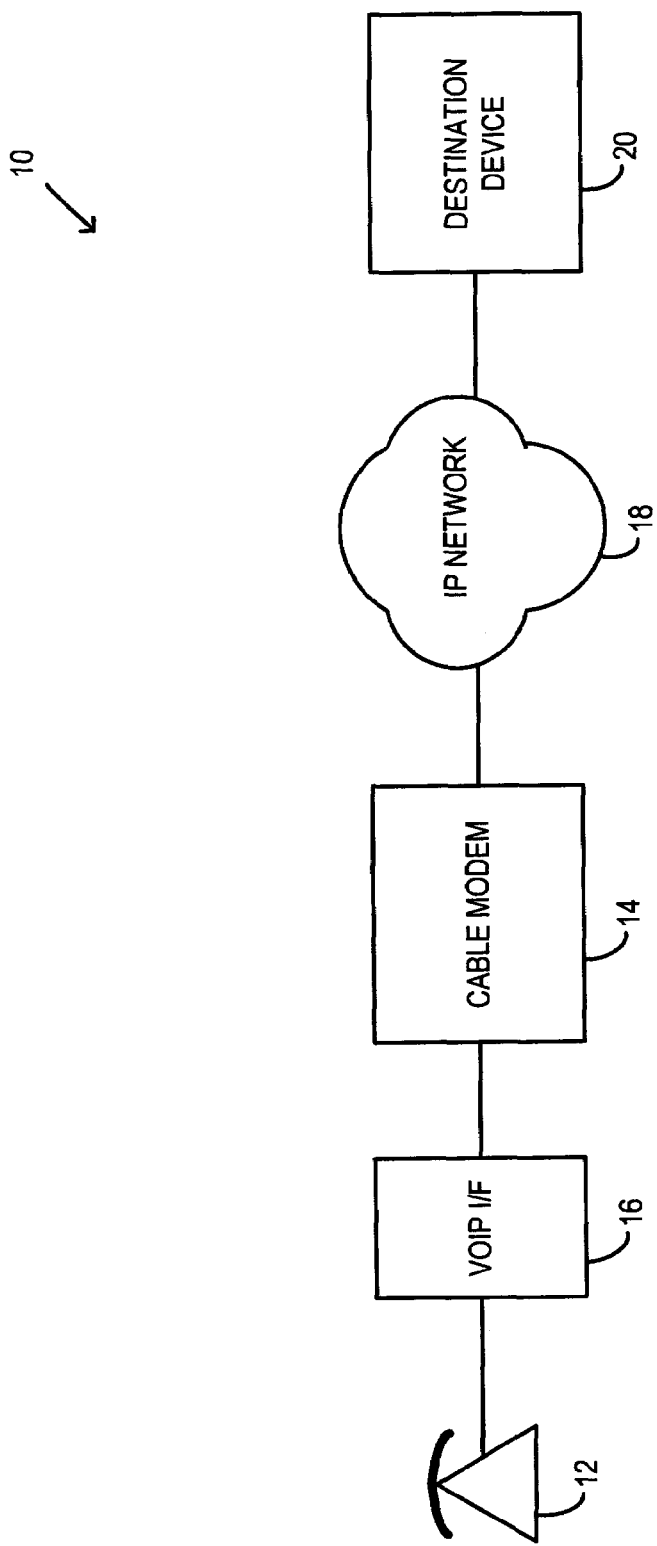
FIG. 1 is a block diagram of an apparatus provided according to some embodiments for transmission and receipt of telephony signals.

FIG. 1 is a block diagram of an apparatus or system 10 which may be provided according to some embodiments to transmit and receive telephony signals. The system 10 may include a telephone 12 coupled to a cable modem 14 via an interface 16. The interface 16 may provide a VOIP signal to the cable modem 14 and may perform clamping of signaling tones in accordance with some embodiments, in a manner to be described below. The cable modem 14 may operate to transmit a telephony signal (e.g. telephony signal data frames) via an internet protocol (IP) communication network 18 to a destination device 20. The destination device 20 may be, for example, a VOIP gateway to transmit the telephony signal to a further downstream device (not shown), such as another telephone. The telephony signal transmitted by the cable modem 14 via the IP network 18 may originate as an analog signal provided by the telephone 12. The signal from the telephone 12 may be converted to data frames, with suppression or partial suppression of signaling tones, by the interface 16.

Figure 2:
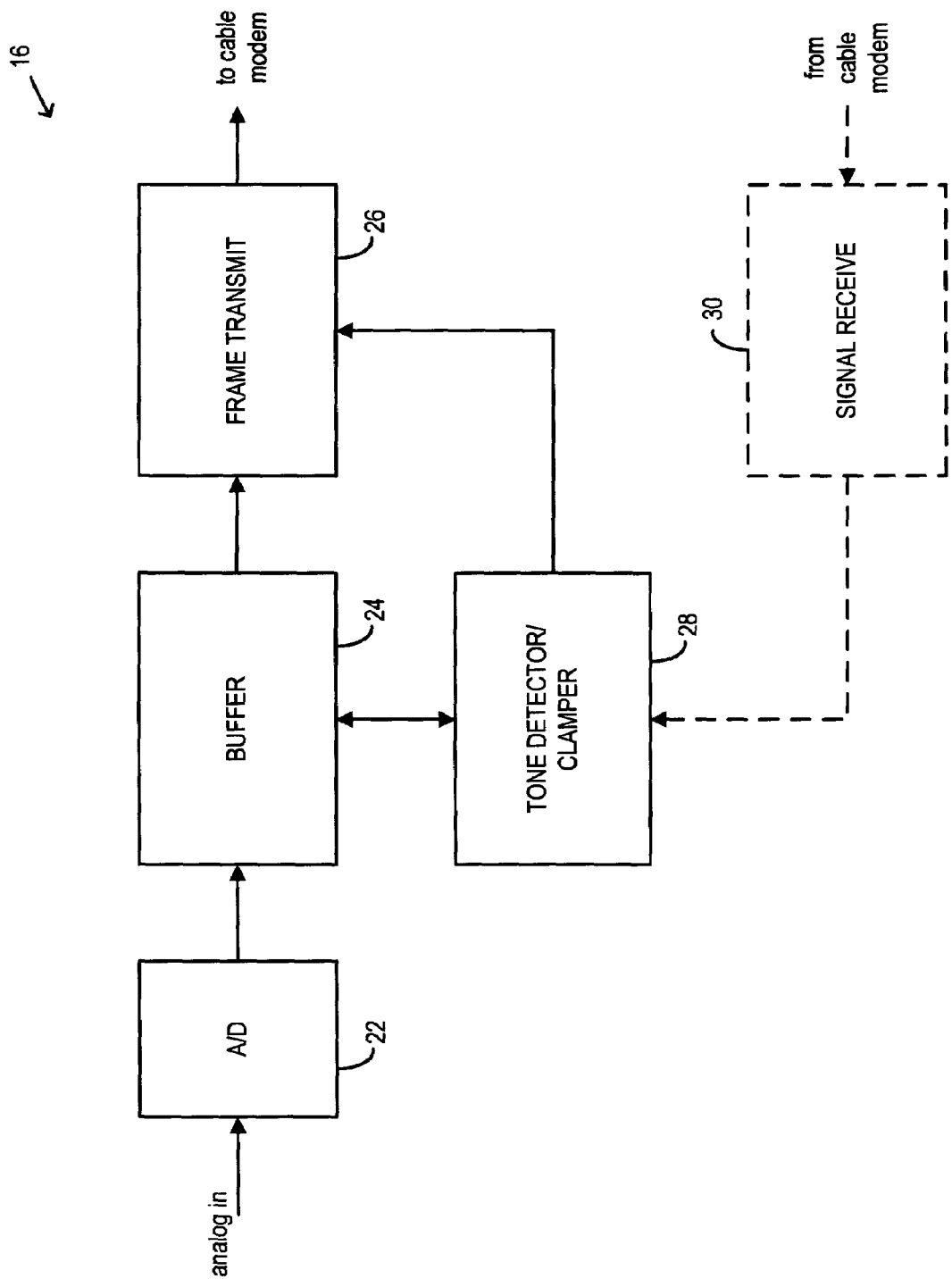
FIG. 2 is a block diagram of an interface that is part of the apparatus of FIG. 1.

FIG. 2 is a block diagram that shows details of the interface 16 according to some embodiments. The interface 16 may include an analog-to-digital converter 22 that receives the analog signal from the telephone 12 (FIG. 1) and outputs a digital telephony signal. The interface 16 may further include a buffer 24 that is coupled to the analog-to-digital converter 22. The buffer may receive the digital telephony signal from the analog-to-digital converter 22 and may temporarily store the digital telephony signal in the form of telephony signal data frames.

There may also be included in the interface 16 a frame transmit block 26 that is coupled to the buffer 24 and operates to transmit to the cable modem 14 (FIG. 1) data frames stored in the buffer 24. In addition, the interface 16 may include a tone detection and clamping block 28 that may be coupled to the buffer 24 and to the frame transmit block 26. Operation of the tone detection and clamping block 28 will be described below in some detail.

Continuing to refer to FIG. 2, in some embodiments the interface 16 may also include a signal receiving block 30 (shown in phantom). The signal receiving block 30 may be coupled to the cable modem 14 to receive a signal provided from the destination device 20 (FIG. 1) and to provide an input to the tone detection and clamping block 28. The significance of this signal path, when present, will also be described below.

The circuitry presented in FIG. 2 mainly relates to an outbound signal path, but the interface 16 may also include circuitry, which is not shown, for an inbound signal path.

At least some portions of the interface 16 (e.g., the frame transmit block 26, the tone detection and clamping block 28 and the signal receiving block 30) may be physically implemented in a number of different ways. For example, each of the frame transmit block 26, the tone detection and clamping block 28 and the signal receiving block 30 may be implemented with one or more suitable software modules to control operation of one or more general purpose processors (not separately shown), such as one or more of a digital signal processor, a microprocessor or a microcontroller. Alternatively, some or all of the frame transmit block 26, the tone detection and clamping block 28 and the signal receiving block 30 may be implemented as circuits (e.g., logic circuitry) that are all or part of an application specific integrated circuit (ASIC).

Figure 3A:
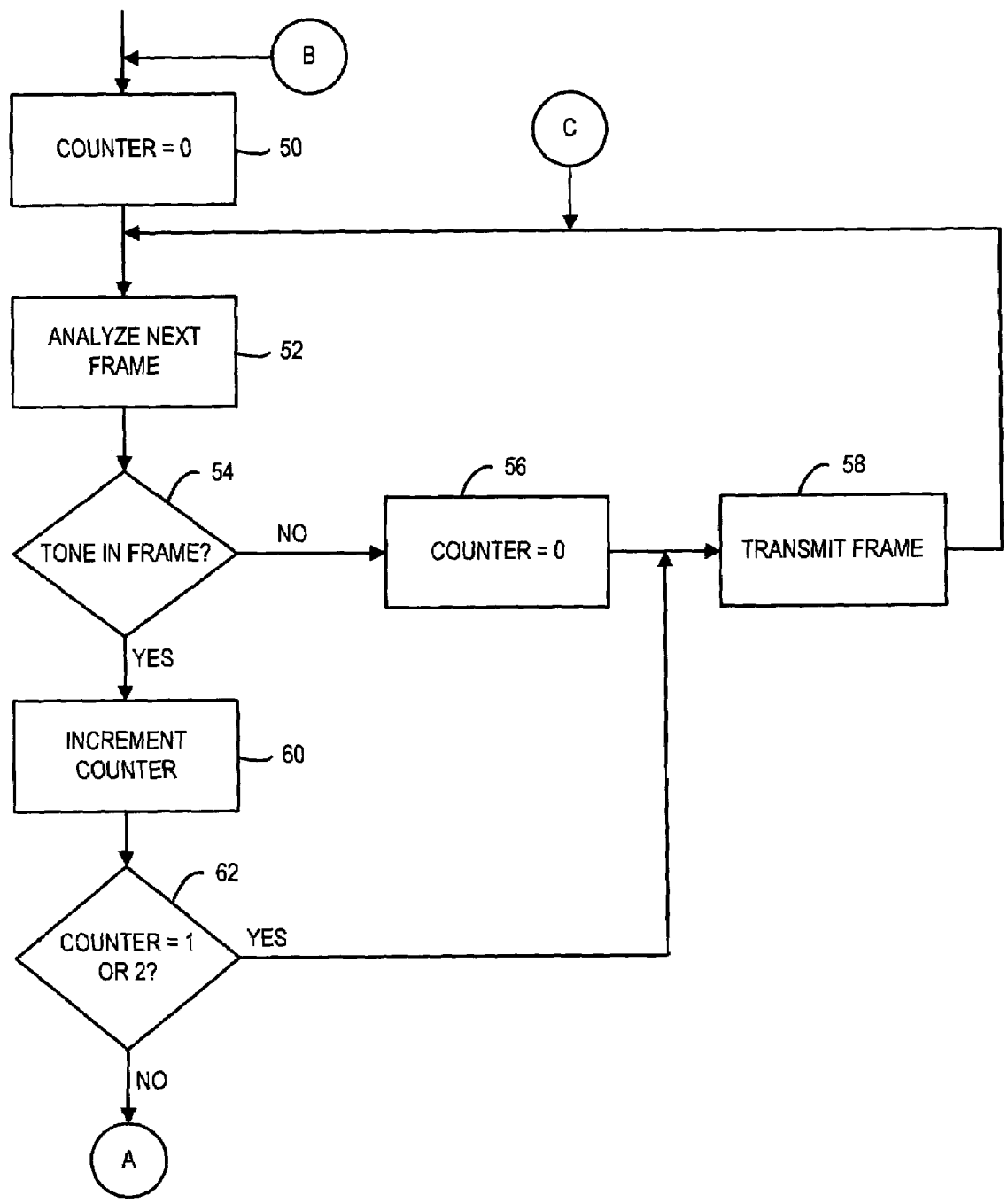
FIGS. 3A and 3B together form a flow chart that illustrates a process that may be carried out according to some embodiments in the interface of FIG. 2.
Figure 3B:
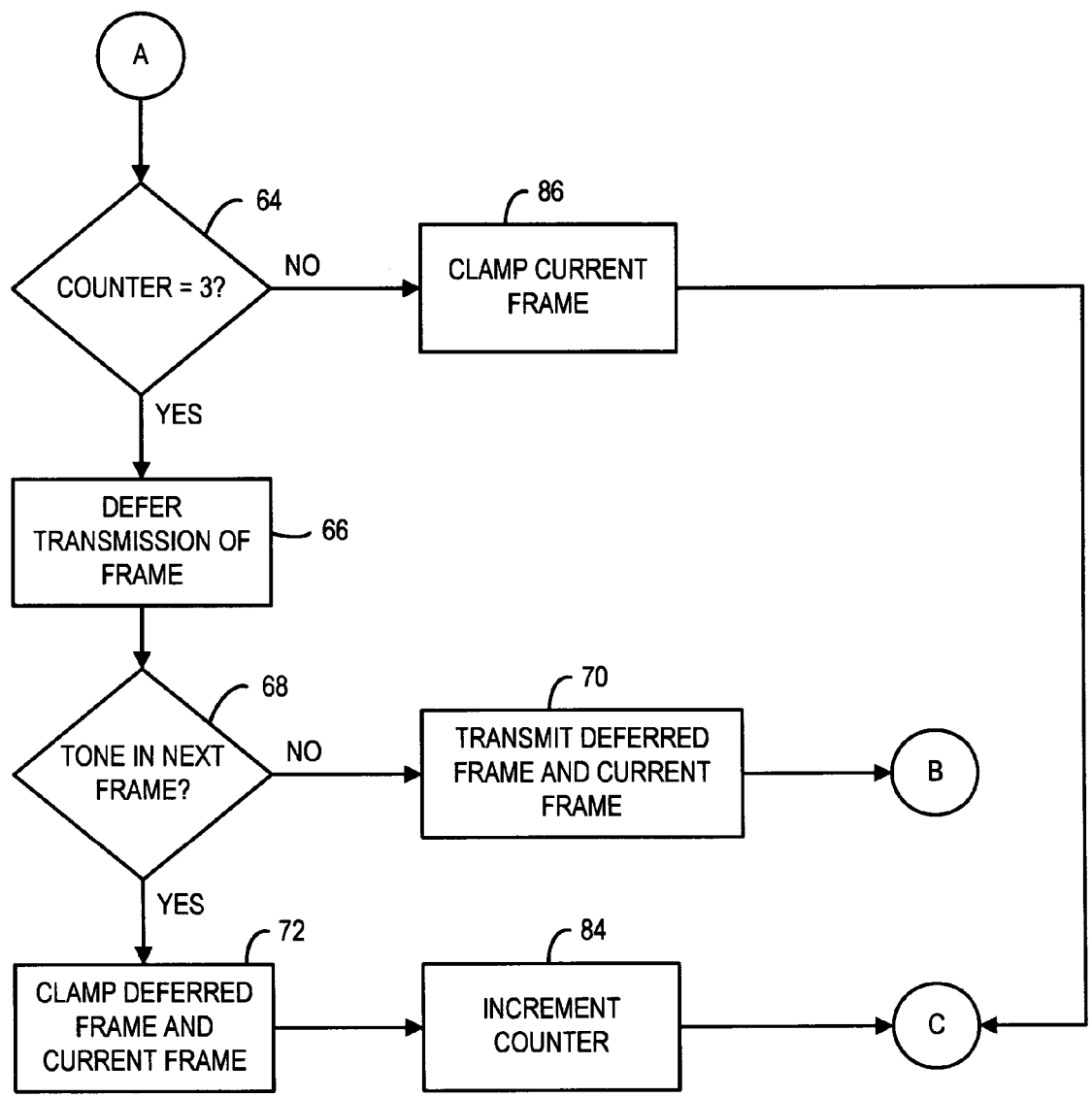

FIGS. 3A and 3B together form a flow chart that illustrates a process that may be performed by the interface 16 (e.g., by the tone detection and clamping block 28), according to some embodiments.

Initially, as indicated at 50 in FIG. 3A, a counter (not separately shown, may be implemented in software) is initialized or reset to a value "0". Then, as indicated at 52, the tone detection and clamping block 28 may analyze the oldest telephony signal data frame stored in the buffer 24 that has not previously been analyzed. The purpose of the analysis at 52 is to determine whether a signaling tone is present in the frame in question. This may be done, for example, in accordance with conventional tone detection practices. For example, a fast Fourier transform (FFT) analysis may be performed with respect to the frame in question.

Next, as indicated at 54, the process of FIGS. 3A and 3B branches on the basis of a result of the analysis performed at 52. If it is determined at 52 that tone is not present in the frame in question, then the process branches to 56, at which the counter is reset to "0" or allowed to remain at the value "0", as the case may be. Following 56, the frame analyzed at 52 is transmitted (as indicated at 58) to the destination device 20 (FIG. 1), via the frame transmit block 26 (FIG. 2), the cable modem 14 (FIG. 1) and the IP network 18. The process then loops back to 52 (FIG. 3A) for tone detection analysis of the next data frame in the buffer 24.

However, if it is determined at 52 that a tone is present in the frame analyzed at 52, then the process of FIGS. 3A and 3B branches at 54 to 60, at which the counter value is incremented (increased by 1). It is next determined, as indicated at 62, whether the counter value, after incrementing at 60, is equal to one of the values "1" and "2". If the counter value is "1" or "2" (i.e., if the counter value is not greater than "2"), then the process branches at 62 to 58. As before, at 58 the frame analyzed at 52 is transmitted to the destination device 20 via the frame transmit block 26, the cable modem 14 and the IP network 18. Also as before, the process loops back from 58 to 52 so that the next data frame in the buffer 24 may be subjected to tone detection analysis.

If it is determined at 62 that the counter value is greater than "2", then the process of FIGS. 3A and 3B branches to 64 (FIG. 3B). At 64 it is determined whether the counter value is 3. (This amounts to determining whether the data frame found at 52, 54 to include tone is the third frame of a sequence of at least three consecutive frames that all include tone, where the frame immediately preceding the sequence did not include tone.) If a positive determination is made at 64 (i.e., if the frame analyzed at 52 was the third frame of such a sequence), then the process of FIGS. 3A and 3B branches to 66.

At 66, the transmission of the frame analyzed at 52 is deferred. For example, no frame is transmitted in the time interval in which the frame analyzed at 52 would have been transmitted if a positive determination had been made at 62 or a negative determination had been made at 54.

Following 66, and as indicated at 68, tone detection analysis is performed with respect to the next frame in the buffer after the frame analyzed at 52, to determine whether tone is present in that next frame. This analysis may be the same sort of tone detection analysis described above in connection with 52. If it is determined at 68 that tone is not present in the frame analyzed at 68, then the process branches to 70. At 70, the frame for which transmission was deferred at 66 is transmitted to the destination device 20 via the frame transmit block 26, the cable modem 14 and the IP network 18. In addition, the next frame (i.e., the frame analyzed at 68 and found not to include tone) is also transmitted to the destination device 20 via the frame transmit block 26, the cable modem 14 and the IP network 18.

From 70, the process of FIGS. 3A and 3B loops back to 50 in FIG. 3A, at which the counter is reset to "0". The next frame after the frames transmitted at 70 may then be subjected to tone detection analysis at 52.

Figure 4:
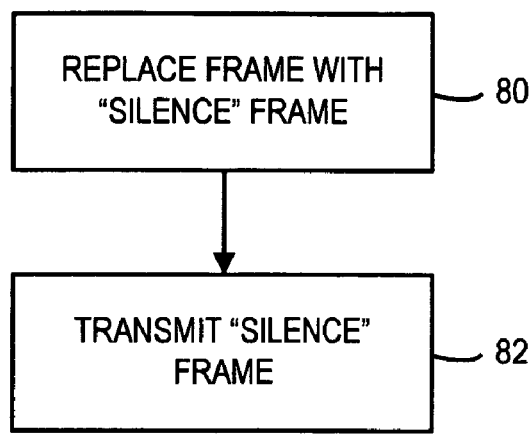
FIG. 4 is a flow chart that illustrates details of a "clamping" operation that may be part of the process of FIGS. 3A and 3B.

If it is determined at 68 that the frame analyzed at 68 includes tone, then the process of FIGS. 3A and 3B branches to 72. At 72 both the frame deferred from transmission at 66 and the next frame found at 68 to include tone are "clamped". FIG. 4 is a flow chart that illustrates details of how the clamping at 72 may be performed according to some embodiments. Initially, at 80 in FIG. 4, the frame to be clamped is replaced with a replacement frame, which may, for example, be a frame which corresponds to a silence audio signal. Then, at 82, the replacement frame is transmitted, in place of the frame to be clamped, to the destination device 20 via the frame transmit block 26, the cable modem 14 and the IP network 18.

Referring once more to FIG. 3B, after 72, the value of the counter is again incremented, as indicated at 84, and the process of FIGS. 3A and 3B then loops back once again to 52 in FIG. 3A, so that the next frame in the buffer 24 (i.e., the frame immediately following the frames clamped at 72) may be subjected to tone detection analysis.

Referring again to the branching that may occur at 64 in FIG. 3B, if it is determined at 64 that the counter value is not "3" (i.e., the counter value is more than "3"; specifically in the logic of the process shown in FIGS. 3A and 3B, the counter value must be at least "5"), then the process branches to 86 in FIG. 3B. At 86, the frame analyzed at 52 is clamped. The clamping at 86 may be performed as described above in connection with FIG. 4. After 86, the process of FIGS. 3A and 3B again loops back to 52 in FIG. 3A so that the next frame after the frame clamped at 86 may be subjected to tone detection analysis.

In the embodiments illustrated by FIGS. 3A and 3B, the following rules are in effect implemented:

(A) If a frame is found to be a "non-tone frame" (i.e., a frame that does not include tone), then the frame is always transmitted.

(B) If a frame is the first or second "tone frame" (i.e., a frame that includes tone) immediately after a non-tone frame, then the frame is always transmitted.

(C) If a frame is the third consecutive tone frame after a non-tone frame, then transmission of the frame is deferred until it is determined whether the next frame is a tone frame. If the next frame is a tone frame (i.e., is the fourth consecutive tone frame after a non-tone frame), then the deferred frame and the next frame are both clamped. If the next frame is not a tone frame, then the deferred frame and the next frame are both transmitted.

(D) If a frame is a fourth or higher consecutive tone frame, then the frame is always clamped. (It will be appreciated that this rule overlaps with, and is consistent with, rule (C) with respect to treatment of the fourth consecutive tone frame after a non-tone frame.)

Figure 5:
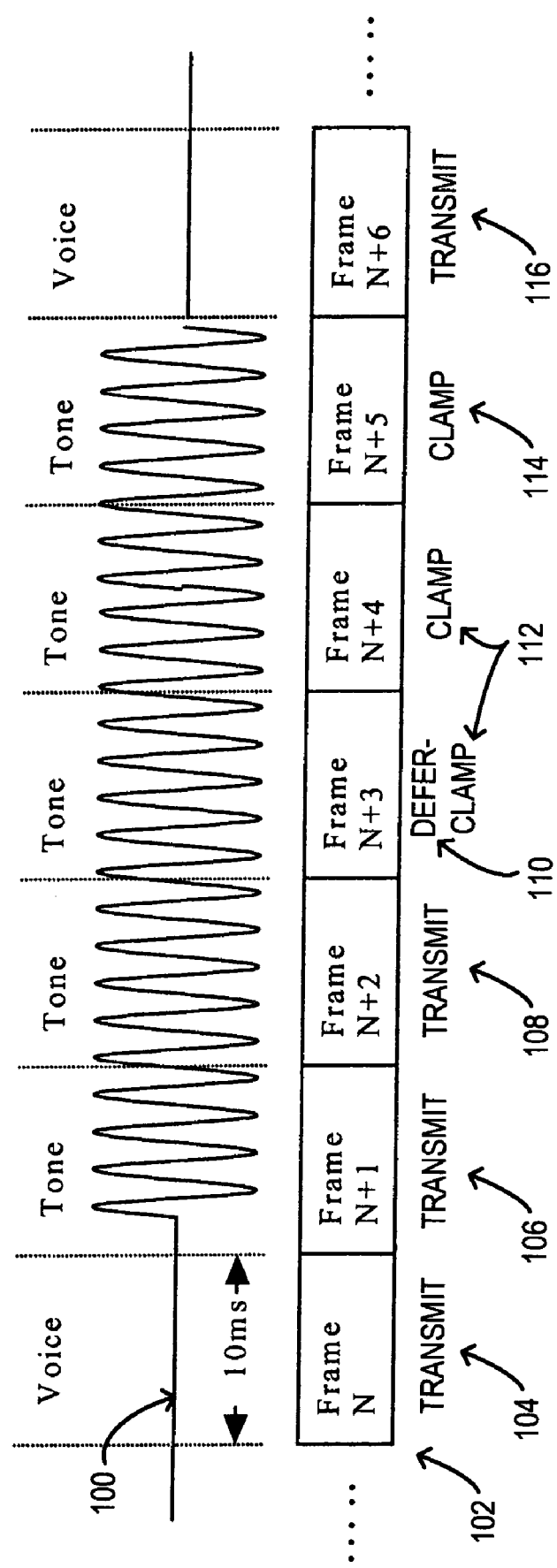
FIG. 5 is a diagram that illustrates an example of operation of the process of FIGS. 3A and 3B.

FIG. 5 is a diagram that illustrates an example of how the process of FIGS. 3A and 3B may operate with respect to a particular tone signal. It is assumed for the purposes of the example of FIG. 5 that each telephony signal data frame corresponds to a signal having a duration of 10 milliseconds. Reference numeral 100 in FIG. 5 indicates a waveform that schematically represents a signal represented by a sequence 102 of telephony signal data frames. It is further assumed for the purposes of this example that a Frame N of the sequence 100 is a non-tone frame and that a signaling tone begins shortly after the start of the next frame, which is Frame N+1. The signaling tone continues through succeeding Frames N+2 through N+4 and ends shortly before the end of Frame N+5. Thus each of Frames N+1 through N+5 is a tone frame. The next frame, which is Frame N+6, is a non-tone frame.

In this example, Frame N, which is a non-tone frame, is transmitted (as indicated at 104) in accordance with rule (A) above and also in accordance with operations indicated at 54 and 58 in FIG. 3A. The counter value is "0" as per the operation indicated at 56.

Continuing to refer to FIG. 5, Frame N+1 is the first tone frame following a non-tone frame. Pursuant to rule (B) and operations indicated at 54, 60, 62 and 58 in FIG. 3A, Frame N+1 is transmitted, as indicated at 106 in FIG. 5, and the counter is incremented to the value "1". Pursuant to the same rule and the same operations, Frame N+2 is also transmitted, as indicated at 108 in FIG. 5, since Frame N+2 is the second tone frame following a non-tone frame. The counter value is incremented to the value "2".

Frame N+3 is the third consecutive tone frame after a non-tone frame. In accordance with rule (C) and the operations indicated at 54, 60, 62 in FIG. 3A and at 64 and 66 in FIG. 3B, transmission of Frame N+3 is deferred to await tone detection analysis of the next frame (Frame N+4). Deferral of transmission of Frame N+3 is indicated at 110 in FIG. 5. The counter value stands at "3" pursuant to operation 60 in FIG. 3A and as detected at operation 64 in FIG. 3B.

In accordance with the further operation of rule (C), Frame N+4 is determined to be a tone frame (operation 68 in FIG. 3B) and both Frames N+3 and N+4 are clamped (as indicated at 112 in FIG. 5) pursuant to the operation indicated at 72 in FIG. 3B. More specifically, as discussed above in connection with FIG. 4, a respective replacement frame (e.g., a frame indicating a "silence" audio signal) is generated and transmitted in place of each of the Frames N+3 and N+4. The counter value is incremented to "4" as indicated at 84 in FIG. 3B.

Frame N+5 is the fifth consecutive tone frame following the non-tone Frame N. In accordance with rule (D) and operations 52, 54, 60, 62 in FIG. 3A and operations 64 and 86 in FIG. 3B, Frame N+5 is clamped, as indicated at 114 in FIG. 5. The counter value now stands at "5".

Frame N+6 is a non-tone frame. Rule (A) again applies, as in the case of Frame N. In accordance with operations 54, 58 in FIG. 3A, Frame N+6 is transmitted, and the counter is reset to "0", as indicated at 56. Transmission of Frame N+6 is indicated at 116 in FIG. 5.

To recap the example illustrated in FIG. 5, only the first two tone frames, i.e. Frames N+1 and N+2, are transmitted out of the sequence of five tone frames shown. Thus the amount of tone leakage cannot be more than 20 milliseconds. With such a short tone, there is little possibility for the tone to be detected and to cause difficulties in transmission or reception. Moreover, each frame is transmitted immediately after tone detection analysis, with the sole exception of Frame N+3, for which the replacement frame is transmitted immediately after tone detection analysis of Frame N+4. Thus the process of FIGS. 3A and 3B results in frame jitter of at most one frame. It can be expected that the destination device 20 and the IP network 18 (FIG. 1) generally are prepared to deal with a degree of jitter that is no more than one frame, so that the jitter introduced by deferring Frame N+3 is also not likely to interfere with transmission and reception of the sequence of frames.

Figure 6:
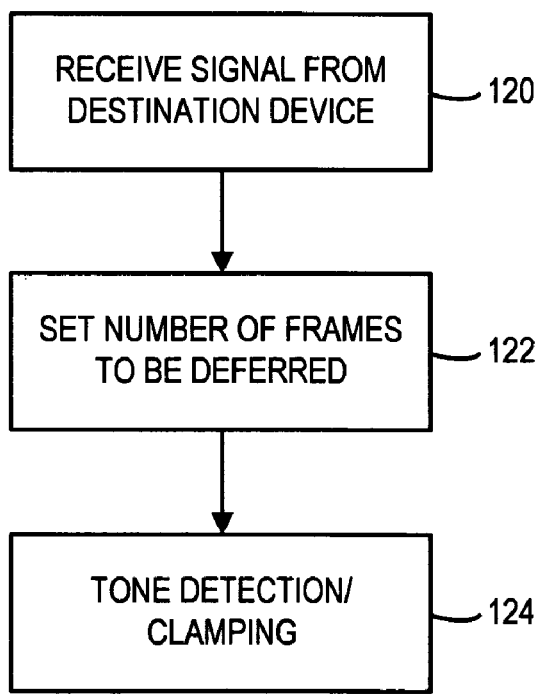
FIG. 6 is a flow chart that illustrates a process that may be carried out according to some other embodiments in the interface of FIG. 2.

FIG. 6 is a flow chart that illustrates another feature that may be implemented in some embodiments of the interface 16. In particular, the signal receive block 30 (FIG. 2) may be present in the interface 16 and may operate to receive from the destination device 20 (FIG. 1), and to provide to the tone detection and clamping block 28 (FIG. 2), a signal indicative of a degree of jitter that the destination device 20 is detecting in the IP network 18. Receipt of the signal from the destination device 20 is indicated at 120 in FIG. 6. The signal may be provided by the destination device 20 as part of a receiver report pursuant to the real-time transport control protocol (RTCP, described in RFC 1890 published by the IETF). For example, the signal may indicate that the degree of jitter present in the IP network 18 is currently equivalent to two frames or more.

As indicated at 122 in FIG. 6, in response to the signal from the destination device, the tone detection and clamping block may change the rules referred to above and/or the process of FIGS. 3A and 3B to change or reset the number of tone frames to be deferred. For example, if the signal from the destination device indicates that jitter to the extent of two frames is present in the IP network, then it can be expected that the destination device is prepared to cope with two frames of jitter, and the tone detection and clamping block may change the rules described above and the clamping operation to defer transmission of both the second and third consecutive tone frames after a non-tone frame, to await tone detection analysis of the next frame after the third consecutive tone frame. In this particular example, if the next frame is a tone frame, then the second, third and next (fourth) frames are all clamped, and the duration of tone leakage is further reduced to a maximum of 10 milliseconds. If the next frame after the third consecutive tone frame is not a tone frame, then the second, third and next frames are all transmitted without clamping. (In the case where the second consecutive tone frame after the non-tone frame is deferred and the next frame after the second consecutive tone frame turns out to be a non-tone frame, the second consecutive tone frame and the next frame may be transmitted without clamping immediately after the next frame after the second consecutive tone frame is found to be a non-tone frame.)

In another example, the signal from the destination device may indicate that jitter in the IP network is present to the extent of three or more frames. Since it can be expected that the destination device is prepared to cope with this amount of jitter, the number of tone frames to be deferred pending tone detection analysis of the fourth frame following a non-tone frame and three consecutive tone frames can be increased to three. In this case tone leakage may be completely eliminated, by taking advantage of the destination device's tolerance of three frames of jitter.

In some embodiments, the number of tone frames to be deferred may be variable on the basis of user input to the interface 16, in addition to or instead of being variable on the basis of a signal from a destination device.

Tone detection and clamping in accordance with, e.g., the examples described in the two previous paragraphs is indicated at 124 in FIG. 6.

To generalize, even if the number of tone frames to be deferred is not adjustable, the interface 16 may operate, according to some embodiments, to defer transmission of a last one or last ones of a sequence of tone frames (i.e., whether a tone frame is deferred may depend on the location of the tone frame in a sequence of tone frames). When it is determined whether the next frame after the sequence of tone frames is also a tone frame, the deferred frame or frames are either clamped or are transmitted without clamping. Also, in the case of some frames, whether or not a frame is deferred may depend on whether or not the frame is a tone frame.

It will be appreciated that the frames may have a different duration from the 10 millisecond duration used for these examples, and that the length of tones to be partially or wholly suppressed may be different from the 40 milliseconds or greater duration indicated in the example described above. Also, as previously indicated, the number of frames to be deferred from transmission may vary and may be set based on a signal from a destination device.

In some embodiments, the processes described above in connection with FIGS. 3A, 3B and/or 6 may be performed in devices other than an interface that supplies VOIP signals to a cable modem.

The several embodiments described herein are solely for the purpose of illustration. The various features described herein need not all be used together, and any one or more of those features may be incorporated in a single embodiment. Therefore, persons skilled in the art will recognize from this description that other embodiments may be practiced with various modifications and alterations.

What is claimed is:

1. A method comprising:
    detecting a tone in each data frame of a sequence of telephony signal data frames;
    transmitting a first data frame of the sequence of telephony signal data frames immediately after detecting the tone therein;
    deferring transmission of a last one or ones of the sequence of telephony signal data frames;
    selectively transmitting the last one or ones of the sequence of data frames and a next data frame that immediately follows the sequence of telephony signal data frames in response to said next data frame not including the tone; and
    selectively transmitting a respective replacement data frame in place of each one of the last one or ones of the sequence of data frames and in place of said next data frame in response to said next data frame including the tone.

2. The method of claim 1, wherein each of the replacement data frames represents a silence audio signal.

3. The method of claim 1, wherein the sequence of telephony signal data frames includes three telephony signal data frames.

4. The method of claim 3, further comprising:
    transmitting a second data frame of the sequence of telephony signal data frames, said second data frame immediately following said first data frame, said transmitting of said second data frame occurring immediately after detecting the tone in said second data frame.

5. The method of claim 1, further comprising:
    detecting that the tone is present in a subsequent data frame that immediately follows said next data frame; and
    transmitting a replacement data frame that represents a silence audio signal in place of said subsequent data frame.

6. The method of claim 1, further comprising:
    receiving a signal from a destination device, the signal indicative of a jitter condition detected by the destination device; and
    determining, based at least in part on the received signal from the destination device, a number of data frames of which transmission is deferred.

7. A method comprising:
    receiving a signal from a destination device, the signal indicative of a jitter condition detected by the destination device;
    determining, based at least in part on the received signal, a number of outbound telephony signal data frames for which transmission is to be deferred in case of detecting a tone in the outbound telephony signal data frames;
    selectively deferring transmission based on a determined number of frames from the received sequence of outbound telephony signal data frames in response to the detected tone;
    transmitting said determined number of frames if the detected tone has a duration that is less than a predetermined duration; and
    selectively replacing each of said determined number of frames with a respective replacement data frame and transmitting said replacement data frames in response to the duration of the detected tone at least equaling the predetermined duration, each said replacement data frame representing a silence audio signal.

8. A method comprising:
    analyzing a first telephony signal data frame to determine whether a tone is present in the first telephony signal data frame;
    selectively immediately transmitting the first telephony signal data frame in response to the first telephony signal data frame not including the tone;
    selectively deferring transmission of the first telephony signal data frame in response to the first telephony signal data frame including the tone;
    analyzing a second telephony signal data frame to determine whether the tone is present in the second telephony signal data frame, the second telephony signal data frame immediately following the first telephony signal data frame in a sequence of telephony signal data frames;
    selectively transmitting the first and second telephony signal data frames immediately after said analyzing of the second telephony signal data frame in response to the second telephony signal data frame not including the tone; and
    selectively transmitting a respective replacement data frame in place of each of the first and second telephony signal data frames in response to the second telephony signal data frame including the tone.

9. The method of claim 8, further comprising:
    analyzing a third telephony signal data frame to determine whether the tone is present in the third telephony signal data frame, the third telephony signal data frame immediately following the second telephony signal data frame in the sequence of telephony signal data frames;
    transmitting the third telephony signal data frame if it is determined that the tone is not present in the third telephony signal data frame; and
    transmitting a replacement data frame in place of the third telephony signal data frame immediately after said analyzing of the third telephony signal data frame if it is determined that the tone is present in the third telephony signal data frame and if it was determined that the tone was present in each of the first and second telephony signal data frames.

10. The method of claim 9, wherein each of the replacement data frames represents a silence audio signal.

11. The method of claim 8, further comprising:
    determining that the tone is present in a telephony signal data frame that immediately precedes the first telephony signal data frame in the sequence of telephony signal data frames; and
    deferring transmission of said telephony signal data frame that immediately precedes the first telephony signal data frame until said analyzing of said second telephony signal data frame.

12. An apparatus comprising:
    a buffer; and
    circuitry coupled to the buffer and configured to:
        detecting a tone in each data frame of a sequence of telephony signal data frames;
        transmitting a first data frame of the sequence of telephony signal data frames immediately after detecting the tone therein;
        deferring transmission of a last one or ones of the sequence of telephony signal data frames;

selectively transmitting the last one or ones of the sequence of data frames and a next data frame that immediately follows the sequence of telephony signal data frames in response to said next data frame not including the tone; and selectively transmitting a respective replacement data frame in place of each one of the last one or ones of the sequence of data frames and in place of said next data frame in response to said next data frame including the tone.

13. The apparatus of claim 12, wherein each of the replacement data frames represents a silence audio signal.

14. The apparatus of claim 12, wherein the sequence of telephony signal data frames includes three telephony signal data frames.

15. The apparatus of claim 14, wherein said circuitry is further configured to:

transmitting a second data frame of the sequence of telephony signal data frames, said second data frame immediately following said first data frame, said transmitting of said second data frame occurring immediately after detecting the tone in said second data frame.

16. The apparatus of claim 12, wherein said circuitry is further configured to:

detecting that the tone is present in a subsequent data frame that immediately follows said next data frame; and transmitting a replacement data frame that represents a silence audio signal in place of said subsequent data frame.

17. The apparatus of claim 12, wherein said circuitry is further configured to:

receiving a signal from a destination device, the signal indicative of a jitter condition detected by the destination device; and determineing based at least in part on the received signal from the destination device, a number of data frames of which transmission is deferred.

18. An apparatus comprising:

a buffer; and circuitry coupled to the buffer and configured to:

receiving a signal from a destination device, the signal indicative of a jitter condition detected by the destination device;

determineing, based at least in part on the received signal, a number of outbound telephony signal data frames for which transmission is to be deferred in case of detecting a tone in the outbound telephony signal data frames;

selectively deferring transmission based on determined number of frames from the received sequence of outbound telephony signal data frames in response to the detected tone;

transmitting said determined number of frames if the detected tone has a duration that is less than a predetermined duration; and selectively replacing each of said determined number of frames with a respective replacement data frame and transmit said replacement data frames in response to the duration of the detected tone at least equaling to the predetermined duration, each said replacement data frame representing a silence audio signal.

19. An apparatus comprising:

a buffer; and circuitry coupled to the buffer and configured to:

analyzing a first telephony signal data frame to determine whether a tone is present in the first telephony signal data frame;

selectively immediately transmitting the first telephony signal data frame in response to the first telephony signal data frame not including the tone;

selectively deferring transmission of the first telephony signal data frame in response to the first telephony signal data frame including the tone;

analyzing a second telephony signal data frame to determine whether the tone is present in the second telephony signal data frame, the second telephony signal data frame immediately following the first telephony signal data frame in a sequence of telephony signal data frames;

selectively transmitting the first and second telephony signal data frames immediately after analysis of the second telephony signal data frame in response to the second telephony signal data frame not including the tone; and selectively transmitting a respective replacement data frame in place of each of the first and second telephony signal data frames in response to the second telephony signal data frame including the tone.

20. The apparatus of claim 19, wherein the circuitry is further operative to:

analyzing a third telephony signal data frame to determine whether the tone is present in the third telephony signal data frame, the third telephony signal data frame immediately following the second telephony signal data frame in the sequence of telephony signal data frames;

transmitting the third telephony signal data frame if it is determined that the tone is not present in the third telephony signal data frame; and transmitting a replacement data frame in place of the third telephony signal data frame immediately after said analyzing of the third telephony signal data frame if it is determined that the tone is present in the third telephony signal data frame and if it was determined that the tone was present in each of the first and second telephony signal data frames.

21. The apparatus of claim 20, wherein each of the replacement data frames represents a silence audio signal.

22. The apparatus of claim 19, wherein the circuitry is further configured to:

determineing that the tone is present in a telephony signal data frame that immediately precedes the first telephony signal data frame in the sequence of telephony signal data frames; and deferring transmission of said telephony signal data frame that immediately precedes the first telephony signal data frame until analysis of said second telephony signal data frame.

23. A system comprising:

an analog-to-digital converter to supply telephony signal data frames;

a buffer coupled to the analog-to-digital converter to temporarily store said telephony signal data frames; and circuitry coupled to the buffer and configured to:

detecting a tone in each data frame of a sequence of telephony signal data frames;

transmitting a first data frame of the sequence of telephony signal data frames immediately after detecting the tone therein;

differing transmission of a last one or ones of the sequence of telephony signal data frames;

selectively transmitting the last one or ones of the sequence of data frames and a next data frame that immediately follows the sequence of telephony signal data frames in response to said next data frame not including the tone; and selectively transmitting a respective replacement data frame in place of each one of the last one or ones of the sequence of data frames and in place of said next data frame in response to said next data frame including the tone.

24. The system of claim 23, wherein each of the replacement data frames represents a silence audio signal.

25. The system of claim 23, wherein the sequence of telephony signal data frames includes three telephony signal data frames.

26. The system of claim 25, wherein said circuitry is further configured to:

transmitting a second data frame of the sequence of telephony signal data frames, said second data frame immediately following said first data frame, said transmitting of said second data frame occurring immediateiy after detecting the tone in said second data frame.

27. The system of claim 23, wherein said circuitry is further configured to:

detecting that the tone is present in a subsequent data frame that immediately follows said next data frame; and transmitting a replacement data frame that represents a silence audio signal in place of said subsequent data frame.

28. The system of claim 23, wherein said circuitry is further configured to:

receiving a signal from a destination device, the signal indicative of a jitter condition detected by the destination device; and determineing, based at least in part on the received signal from the destination device, a number of data frames of which transmission is deferred.

29. An apparatus comprising:

a computer readable medium having stored therein a plurality of computer executable instructions that when executed result in the following:

detecting a tone in each data frame of a sequence of telephony signal data frames;

transmitting a first data frame of the sequence of telephony signal data frames immediately after detecting the tone therein;

deferring transmission of a last one or ones of the sequence of telephony signal data frames;

selectively transmitting the last one or ones of the sequence of data frames and a next data frame that immediately follows the sequence of telephony signal data frames in response to said next data frame not including the tone; and selectively transmitting a respective replacement data frame in place of each one of the last one or ones of the sequence of data frames and in place of said next data frame in response to said next data frame including the tone.

30. The apparatus of claim 29, wherein each of the replacement data frames represents a silence audio signal.

31. The apparatus of claim 29, wherein the sequence of telephony signal data frames includes three telephony signal data frames.

32. The apparatus of claim 31, wherein the instructions further result in:

transmitting a second data frame of the sequence of telephony signal data frames, said second data frame immediately following said first data frame, said transmitting of said second data frame occurring immediately after detecting the tone in said second data frame.

33. The apparatus of claim 29, wherein the instructions further result in:

detecting that the tone is present in a subsequent data frame that immediately follows said next data frame; and transmitting a replacement data frame that represents a silence audio signal in place of said subsequent data frame.

34. The apparatus of claim 29, wherein the instructions further result in:

receiving a signal from a destination device, the signal indicative of a jitter condition detected by the destination device; and determining, based at least in part on the received signal from the destination device, a number of data frames of which transmission is deferred.

* * * * *